United States Patent [19]

Cadet

[11] Patent Number: 5,158,799
[45] Date of Patent: Oct. 27, 1992

[54] PROCESS FOR THE PRODUCTION OF A DEHYDRATED COOKED MEAT

[75] Inventor: Michel Cadet, Le Mesnil En Thelle, France

[73] Assignee: Nestec S.A., Vevey, Switzerland

[21] Appl. No.: 738,599

[22] Filed: Jul. 31, 1991

[30] Foreign Application Priority Data

Aug. 13, 1990 [EP] European Pat. Off. ........ 90115514.3

[51] Int. Cl.⁵ ...................... A23L 1/311; A23L 1/314
[52] U.S. Cl. .................... 426/646; 426/417; 426/438; 426/473
[58] Field of Search ............... 426/438, 465, 473, 417, 426/646

[56] References Cited

U.S. PATENT DOCUMENTS

| | | | |
|---|---|---|---|
| 2,439,180 | 4/1948 | McKee et al. | 426/473 |
| 4,645,676 | 2/1987 | Nakazono | 426/438 X |
| 4,786,516 | 11/1988 | Sugisawa et al. | 426/438 X |

FOREIGN PATENT DOCUMENTS

| | | | |
|---|---|---|---|
| 46-33699 | 10/1971 | Japan | 426/438 |
| 62-19073 | 1/1987 | Japan | 426/438 |
| 62-29941 | 2/1987 | Japan | 426/438 |
| 63-263063 | 10/1988 | Japan | 426/438 |

*Primary Examiner*—Arthur L. Corbin
*Attorney, Agent, or Firm*—Vogt & O'Donnell

[57] ABSTRACT

A dehydrated meat is obtained by cooking meat in animal fat under atmospheric pressure to a dry matter content of at least 60% by weight, predrying the cooked meat, granulating the predried meat and then dehydrating the granulated meat.

7 Claims, No Drawings

PROCESS FOR THE PRODUCTION OF A DEHYDRATED COOKED MEAT

BACKGROUND OF THE INVENTION

This invention relates to a process for the production of a dehydrated cooked meat.

There are processes in which a meat is cooked in an autoclave under a pressure greater than atmospheric pressure, the product obtained optionally being deboned and then predried in an oven under a partial vacuum before being granulated and completely dehydrated.

The disadvantages of processes of this type are due mainly to the fact that the cooked meat has to be predried for several hours. Thus, it is standard practice to predry the meat for 5 hours. In addition, despite predrying, a binder, for example egg white, still has to be added to the predried product to allow correct granulation before final drying.

Accordingly, the problem addressed by the present invention was to provide a process for the production of a dehydrated cooked meat which, on the one hand, would enable the predrying time to be substantially reduced and, on the other hand, would eliminate the need to use a binder.

SUMMARY OF THE INVENTION

The present invention relates to a process for the production of a dehydrated cooked meat in which the meat is cooked in animal fat under atmospheric pressure until it has a dry matter content above 60% and is then predried before finally being granulated and dehydrated.

By cooking in animal fat, it is possible, with cooking times comparable with those of the prior art, to obtain an intermediate product which requires a far shorter predrying time to allow correct subsequent granulation. In addition, it is possible completely to eliminate the need to use a binder.

Moreover, the process according to the invention enables a dried cooked meat having exceptional bacteriological properties to be obtained.

Finally, if the meat is cooked in a coverless autoclave in the fat of an animal of the same species as that from which the meat to be cooked emanates, it is possible to obtain an "unrefined" fat which, while showing excellent keeping properties, has a slight roasted flavour which, organoleptically, is entirely satisfactory and remarkable.

Other features and advantages of the invention will become apparent from the following description.

DETAILED DESCRIPTION OF THE INVENTION

In the context of the invention, the term "meat" encompasses poultry meat, such as chicken or fowl, beef, pork and veal.

The starting material used may be fresh or frozen.

If the meat is frozen, it may be defrosted, for example continuously in a hot-air or microwave tunnel.

In the practical application of the process according to the invention, the meat may have been completely or partly freed from its bones and its skin before cooking.

The meat may also have been cut, for example into pieces weighing a few hundred grams to a few kilograms, in order to accelerate the cooking process.

The meat and the cooking fat are placed in a double-jacketed coverless autoclave. The mixture may be cooked for 40 to 120 minutes at a temperature of 100° to 120° C. at atmospheric pressure.

The cooking fat may advantageously be stabilized with an antioxidant, such as butyl hydroxyl anisole (BHA) or octyl gallate.

On completion of cooking, the meat is separated from the cooking fat, for example simply by draining.

The product may then be ground, for example in a helical-screw mincer with a grill which may have 9 mm diameter holes.

If necessary, the product is then deboned. At this stage, additives, such as fine salt or aromatic herbs may be added, and a binder, such as egg white, may be incorporated in the mixture.

The product may then be predried under a partial vacuum such as in a heating-plate vacuum oven over a period of less than 2 h at a temperature of 98° C. and under a residual pressure of 30 mm Hg. The product is then granulated, for example in a mincer, to produce pieces a few millimetres in size.

Finally, the product is subjected to final dehydration to a dry matter content above 95% by weight. This final dehydration step may be carried out over a period of a few hours in a heating-plate oven under a partial vacuum.

EXAMPLES

The invention is illustrated by the following Examples in which percentages are by weight.

EXAMPLE 1

Frozen fowl necks were defrosted.

270 kg fowl necks and 520 kg fowl fat stabilized with BHA and octyl gallate were cooked for 75 minutes at 105° C. in a coverless autoclave at atmospheric pressure.

139 kg meat having a dry matter content of 70% and 499 kg unrefined fat were thus obtained, part of the cooking fat having migrated into the fowl necks.

The unrefined fat was then refined by heating for 30 minutes at 110° C., thus giving 494 kg refined fat.

The 139 kg meat were minced in a helical-screw mincer equipped with a grill having 9 mm diameter holes. The minced product was then mechanically deboned, producing 85 kg deboned meat.

The 85 kg deboned meat were divided into two 42.5 kg batches.

5,100 kg fine salt and 5 g powdered rosemary were added to a first batch of 42.5 kg.

A first granulation test was carried out in a mincer equipped with a 10 mm thick grill having 3 mm diameter holes. The firmness of the granules was mediocre.

After predrying in a heating-plate vacuum oven for 1 hour at 98° C. under a residual pressure of 5260 Pa, the product was granulated by passage through a mincer of the type used for the granulation test before predrying.

On this occasion, granulation proceeded satisfactorily. More particularly, the granules obtained did not solidify. The product was then dehydrated for 2.5 hours at 98° C. in an oven under a partial vacuum of 5,260 Pa.

34 kg granules having a dry matter content of 98.5% were thus obtained.

EXAMPLE 2

5,800 kg fine salt, 5 g powdered rosemary and 600 g powdered egg white were added to the second batch of 42.5 kg obtained from the 85 kg produced in Example 1.

A granulation test was carried out on the product obtained. The firmness of the granules was again mediocre.

By contrast, after predrying in exactly the same way as in Example 1, granulation proceeded satisfactorily. The product was then subjected to exactly the same final dehydration as in Example 1. 34 kg granules having a dry matter content of 98.3% were obtained.

EXAMPLE 3

Whole eviscerated fowls without the feet or wing tips were defrosted.

252 kg fowl and 550 kg fowl fat stabilized with BHA and octyl gallate were cooked for 75 minutes at 110° C. in a coverless autoclave at atmospheric pressure.

133.5 kg meat having a dry matter content of 64% and 565 kg unrefined fat were thus obtained, part of the fat of the cooked fowls having migrated into the cooking.

The unrefined fat was then refined for 30 minutes at 110° C., producing 560 kg refined fat.

The 137.5 kg cooked meat were minced in a helical-screw mincer equipped with a grill having 9 mm diameter holes.

The minced product was then mechanically deboned, producing 103 kg deboned meat.

The 103 kg deboned meat was divided into two 51.500 kg batches.

7,000 kg fine salt and 6 g powdered rosemary were added to a first batch of 51.5 kg.

A granulation test identical with that carried out in Examples 1 and 2 again revealed inadequate firmness.

After predrying in a heating-plate vacuum oven for 1 hour at a temperature of 98° C. and under a residual pressure of 5,260 Pa, the product was granulated by passage through a mincer identical with that used in Examples 1 and 2.

Granulation proceeded satisfactorily.

The product was then subjected to final dehydration over a period of 2.5 h at 98° C. in an oven under a partial vacuum of 5,260 Pa.

37 kg granules having a dry matter content of 97.2% were thus obtained.

EXAMPLE 4

7 kg fine salt, 820 g powdered egg white and 6 g powdered rosemary were added to the second batch of 51.5 kg from the 103 kg produced in Example 3.

A granulation test was carried out on the product obtained, the firmness of the granules again being unsatisfactory.

By contrast, after predrying in exactly the same way as in Examples 1, 2 and 3, granulation proceeded satisfactorily.

The product was then subjected to final dehydration in exactly the same way as in Examples 1, 2 and 3.

38 kg granules having a dry matter content of 97.55% were thus obtained.

BACTERIOLOGICAL STUDIES

Bacteriological studies showed that the properties of the product obtained were excellent.

The results of these bacteriological studies are set out in the following Table.

|  | Neck meat | | Fowl meat | |
| --- | --- | --- | --- | --- |
|  | Example 1 | Example 2 | Example 3 | Example 4 |
| Total germs/g (standard 10,000) | 30 | 60 | 760 | 60 |
| Total coliforms/g | <1 | <1 | <1 | <1 |
| Fecal coliforms/g | <1 | <1 | <1 | <1 |
| Escherichia coli/g | <1 | <1 | <1 | <1 |
| Staphylococci/g | <1 | <10 | <1 | <1 |
| Sulfite-reducing clostridium/g | <1 | <1 | <1 | <1 |
| Yeasts/g | <10 | <10 | <10 | <10 |
| Moulds/g | <10 | <10 | <10 | <10 |

The following Comparison Example shows that the necessary predrying time in the process according to the invention is shorter than in the prior art.

COMPARISON EXAMPLE

The following Table illustrates the known process applied, on the one hand, to chicken necks and, on the other hand, to whole chickens.

|  | Chicken necks | Whole chickens |
| --- | --- | --- |
| Starting volume (kg) | 300 | 300 |
| Cooking in an autoclave | | |
| pressure (bar) | 1.3 | 1.7 |
| duration (minutes) | 65 | 40 |
| temperature (°C.) | 125 | 130 |
| Dry matter after cooking (%) | 38 | 45 |
| Egg white (kg) | 3 | 3 |
| Predrying | | |
| pressure (bar) | 50 | 50 |
| temperature (°C.) | 95 | 95 |
| time (h) | 4.5 | 4.5 |
| Granulation (mm) | 3 | 3 |
| Drying | | |
| pressure (bar) | 50 | 50 |
| temperature (°C.) | 95 | 95 |
| duration (h) | 2.75 | 2.75 |

It can clearly be seen that the predrying time is shortened from 4.5 to 1 h and that there is no longer any need to use egg white.

I claim:

1. In a process for production of a dehydrated cooked meat wherein meat is cooked, the cooked meat is predried in an oven under partial vacuum, the predried meat is granulated and the granulated meat is dehydrated, the improvement comprising cooking the meat in an animal fat and under atmospheric pressure to obtain a cooked meat having a dry matter content of at least 60% by weight.

2. A process according to claim 1 further comprising refining the fat after cooking.

3. A process according to claim 1 wherein the meat is cooked at a temperature of from 100° C. to 120° C.

4. A process according to claim 1 wherein the fat is stabilized with an antioxidant.

5. A process according to claim 1 further comprising grinding the cooked meat to obtain a ground meat for predrying.

6. A process according to claim 5 further comprising adding a binder to the ground meat prior to predrying the ground meat.

7. A process according to claim 6 wherein the binder is egg white.

* * * * *